United States Patent [19]

Jablonski

[11] 4,074,941
[45] Feb. 21, 1978

[54] CAM OPERATED TOGGLE FOR SECURING A LIGHT FIXTURE OR THE LIKE TO A TUBE

[75] Inventor: Edward R. Jablonski, South Milwaukee, Wis.

[73] Assignee: Appleton Electric Company, Chicago, Ill.

[21] Appl. No.: 704,226

[22] Filed: July 12, 1976

[51] Int. Cl.² ............................................. F16B 21/00
[52] U.S. Cl. .................................. 403/260; 85/3 S; 85/74; 248/219.2; 403/361; 362/431
[58] Field of Search ............... 85/3 R, 3 K, 3 S, 66, 85/79, 74; 248/221 B, 188, 219.2; 403/260, 263, 264, 361, 376; 108/150, 151; 240/84; 279/2; 292/256.73, 256.75, 260, 49, 55

[56] References Cited

U.S. PATENT DOCUMENTS

| 135,822 | 2/1873 | Laforge | 292/55 |
| 682,045 | 9/1901 | de Carlo | 85/66 |
| 1,153,797 | 9/1915 | Kegreisz | 85/3 R |
| 2,192,484 | 3/1940 | Bryan | 85/3 R |
| 2,605,668 | 8/1952 | Hollopeter | 85/3 S |
| 2,950,141 | 8/1960 | Koff | 85/3 S |
| 3,403,594 | 10/1968 | Newell | 85/3 R |
| 3,794,826 | 2/1974 | Jablonski | 240/84 |
| 3,920,145 | 11/1975 | McGregor | 85/3 S |

FOREIGN PATENT DOCUMENTS 1,101,554  3/1961  Germany ................................. 85/66

Primary Examiner—Marion Parsons, Jr.
Attorney, Agent, or Firm—Darbo & Vandenburgh

[57] ABSTRACT

A hub extends into the top of a pole and has a central web. A carriage bolt extends through this web with its nut exposed on the top of the web and its head below the web within the pole. The central support of the toggle rests on and engages the bolt head. This support has a base and two sides. The two sides of two arms are in juxtaposition to the support sides and are pivotally secured thereto by pins. The arms extend at an angle toward the hub and are in contact therewith to be cammed outwardly by the hub as the support is drawn toward the hub by the bolt thereby causing the distal ends of the arms to engage the pole. A spring on the support base resiliently forces the arms into contact with the hub and, prior to the bolt being drawn up, holds the arms sufficiently close together to freely slip within the end of the pole.

1 Claim, 5 Drawing Figures

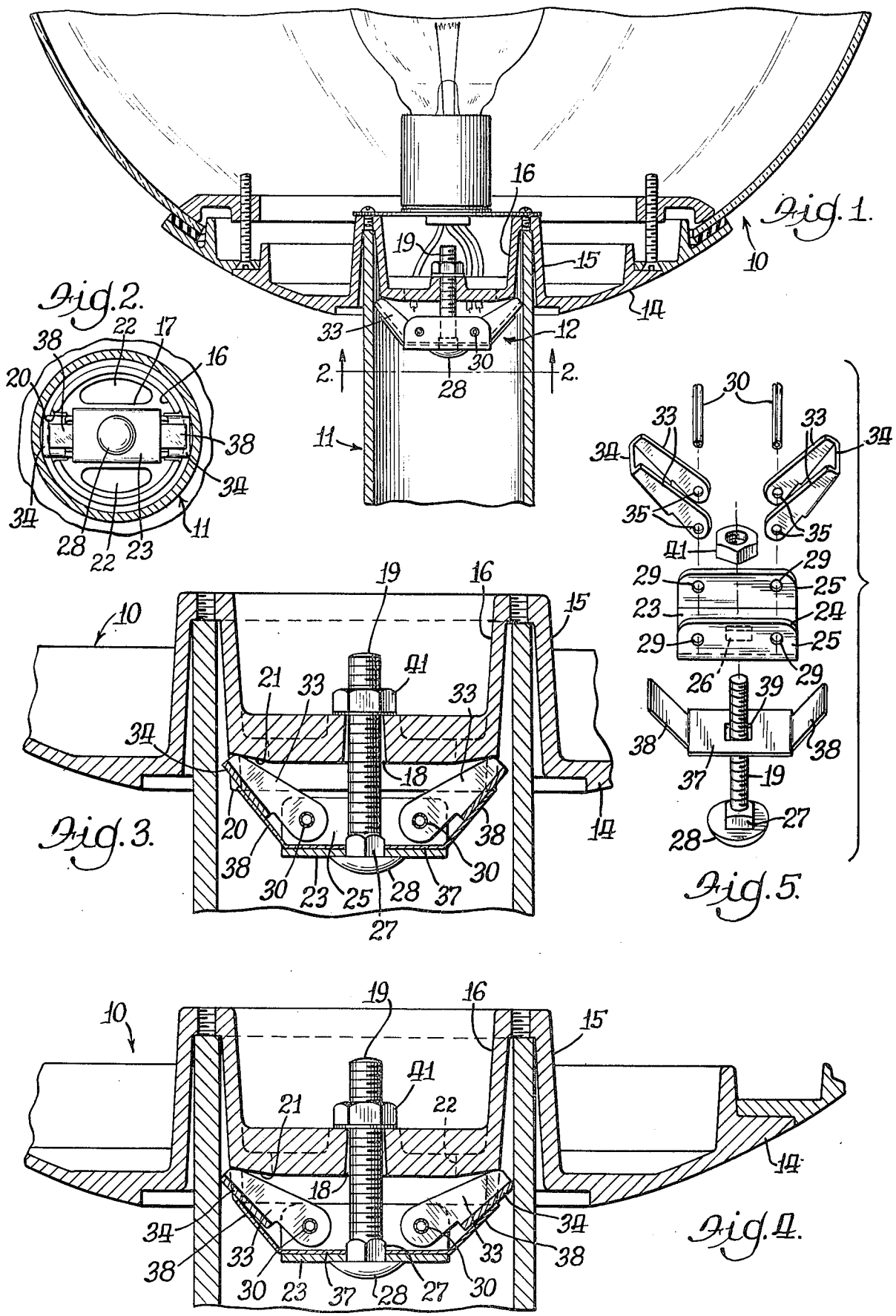

CAM OPERATED TOGGLE FOR SECURING A LIGHT FIXTURE OR THE LIKE TO A TUBE

BACKGROUND AND SUMMARY OF THE INVENTION

Various arrangements are known for securing a light fixture to a pole in a manner such that they may not be separated without disassembling the light fixture. See, for example, U.S. Pat. Nos. 3,794,826 and 3,508,731. Thus the mechanical components by which engagement is obtained are protected from the elements and thievery is discouraged by reason of the fact that these components are concealed within the light fixture.

Of the prior art structures mentioned in the preceding paragraph, that disclosed in U.S. Pat. No. 3,794,826 is most closely related to the present invention. It employs one or more springs on the fixture which can be drawn into engagement with the pole by a bolt. While this does an adequate job of locking the fixture to the pole, it is likely that the spring is so deformed during the locking process that it can become very difficult to release the spring to permit the disassembly of the light fixture from the pole.

In the present invention the locking engagement between the fixture and the pole is obtained by a toggle whose arms are cammed outwardly into engagement with the pole as the bolt which connects the toggle to the fixture is tightened. The components of the toggle are relatively rigig (certainly as compared to the prior art spring structure) and will not be deformed during a normal application of the fixture to the light pole. Thus under normal use the toggle can be readily released from its engagement with the pole to permit the light fixture to be separated from the pole. While a spring is employed in the toggle of the present invention, any forces applied to the spring when the toggle engages the pole are not sufficient to cause a permanent deformation of the spring.

Further objects and advantages will become apparent from the following description and attached drawing.

DESCRIPTION OF THE DRAWING

FIG. 1 is a sectional view through a light fixture mounted on a pole utilizing an embodiment of the present invention;

FIG. 2 is a section taken at line 2—2 of FIG. 1;

FIG. 3 is an enlarged partial section as viewed in FIG. 1 showing the toggle arrangement before it has engaged the pole;

FIG. 4 is a view corresponding to FIG. 3, but showing the toggle drawn into engagement with the pole; and FIG. 5 is an exploded isometric view of the components of the toggle.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

FIG. 1 illustrates a light fixture, generally 10, which is mountd on a pole in the form of a tube, generally 11. A toggle apparatus, generally 12, which is the subject of the present invention, is employed to obtain engagement between the light fixture and the pole.

The light fixture has a metal base 14 which includes an outer wall 15 and an inner wall 16 of a configuration to fit about the outside and the inside respectively of the tube 11. Thus, if the tube 11 is cylindrical the walls 15 and 16 would be substantially cylindrical except for the slight taper illustrated to facilitate the casting of the base 14 and the positioning of the base onto the tube. The inner wall 16 along with a web 17 form a hub. This hub has a central opening 18 to receive carriage bolt 19 of toggle 12. The wall 16 extends below web 17, but that portion of the wall is provided with two slots 20. In the area of these slots the bottom face of the web is tapered to provide cam surfaces 21. At each side of web 17 are openings 22 through which the electric wires to the light fixture can pass.

The toggle includes a rigid support 23. This support includes a base 24 having two sides 25 integral therewith. The base has a rectangular opening 26 of a size such that the base 24 fits snugly about the rectangular portion 27 of head 28 of the carriage bolt 19. The sides 25 have openings 29 which snugly receive drive pins 30.

The toggle has two arms, each being formed by sides 33 and a plate 34 integral therewith. The sides 33 have openings 35 of a size such that the arms pivot easily on the pins 30.

A spring includes a base 37 and two arms 38. Base 37 has a rectangular opening 39 to receive the rectangular portion 27 of the carriage bolt. In FIG. 5 a spring 37, 38 is shown below the support 23 to facilitate illustration. Actually the spring mounts above the support, i.e., between base 24 of the support and the hub, as seen in FIGS. 1-4.

Initially, the toggle is assembled with the toggle relatively loose, i.e., nut 41 of the carriage bolt is backed off towards the free end of the bolt. The arms 38 of the spring hold the toggle arms 33-34 toward each other sufficiently so that the distal ends of the arms are spaced a distance substantially smaller than the corresponding internal dimension of the tube 11. This permits the toggle to slide freely into the tube as the fixture is mounted onto the end of the tube. The spring arms also hold the toggle arms into contact with the cam surfaces 21.

After the fixture has been supported on the tube in the manner illustrated in FIG. 3, the nut 41 is tightened on bolt 19, the two forming a draw bolt means to draw the toggle support toward the hub. The bolt is restrain3d against rotation by reason of the fact that the rectangular portion 27 is locked into support 23 and the fact that the arms of the toggle fit within slots 20 of wall 16 so that the toggle cannot rotate with respect to the base 14 of the light fixture. As the nut 41 is tightened the arms of the toggle are cammed outwardly by reason of the contact between sides 33 and cam surfaces 21. Thus, the outer edges of plates 34 of the arms are forced against the inner wall of the tube 11 and "bite" into that wall. When this occurs there is discernible resistance to the rotation of nut 41 on the bolt and the installer can beware of the bite by reason of the significantly increased torque required to rotate nut 41. This "bite" will prevent the light fixture from being lifted off the tube. With a round tube, the bite occurs at the outer corners of plates 34 with the pressure thus applied at four spaced points. There is a good bite at those points and a secure locking of the fixture to the tube. Were the tube rectangular, the bite would be along a line contact and fully adequate to hold the fixture on the post.

It will be noted that the arms, even when engaged with the tube as illustrated in FIG. 4, still extend upwardly at an angle. This is obtained by reason of the fact that the distance between the pivot pins 30 plus the length of the arms from those pivot pins to the distal ends at which the bite occurs is substantially greater than the corresponding transverse dimension of the inside of the tube. This allows the toggle arrangement to engage a tube even though there may be a significant variation of the internal dimension of the tube at the location at which the bite occurs.

If it is desired to remove the light fixture from the tube, e.g., to change the wiring leading to the fixture, etc., the nut 41 is loosened. In most instances this release of tension of the toggle will be sufficient to allow the arms to retract under the urging of the spring. In an occasional instance, the arms will have bitten sufficiently into the tube so that unlocking does not occur immediately. In that event, a slight tap or two on the top of bolt 19 will result in the release of the toggle to the position illustrated in FIG. 3. With the arms released, the fixture can, of course, be easily lifted off of the tube.

Other draw bolt means for forcing the toggle support upwardly towards the hub could be employed as a substitute for carriage bolt 19 and nut 41 such as, for example, a lever pivotally secured to a rod which was positioned in the manner of the bolt with the lever having cams contacting the top of web 17 to force the rod upwardly as the cam was rotated from one position to another. In some embodiments, particularly those employed with large tubes, several draw bolt means might be employed in place of the single one illustrated.

I claim:

1. In an apparatus for affixing a body to the end of a tube having a uniform cross-section formed about an axis wherein the body includes a hub which extends into the tube from said end and has a distal end within said tube, and said apparatus includes a draw bolt means extending through said hub generally parallel to said axis, said draw bolt means having head means within the tube beyond said hub and means on the opposite side of the hub from said head means to draw said head means towards said hub, and a device between said hub and said head means for engaging said tube in response to said head means being so drawn towards said hub, the improvement wherein said device comprises:

a rigid support centrally positioned within said tube and extending to opposite sides of said axis, said support being engaged by said head means so that as said head means is drawn toward said hub said support is moved correspondingly, said support being of generally "U" shaped configuration in cross-section and comprising a base and two sides integral with the base, said sides extending from the base towards the hub and at opposite sides of said axis;

a pair of engaging arms each having a distal end and a proximal end, each arm including two sides and an integral connecting plate, the sides of the arm being in juxtaposition to the sides of the base respectively and pivotally connected thereto, the connecting plate extending approximately to the distal end of the arm and having an outer edge at the distal end, the arms being of a length such that the distance between the pivotal connections plus the length of each arm from the pivotal connection to the distal end of each arm is greater than the inside dimension of the tube normal to the axis in the direction corresponding to the measurement between the pivotal connections, said arms extending upwardly and outwardly to contact the hub and the inside of the tube, whereby as the head of the draw bolt means draws said support towards the hub the hub cams the arms outwardly so that the said outer edges of the plates are forced against the inside of the tube to engage the tube; and a spring having a base and arms at the respective ends thereof, said spring base being on the side of the support base adjacent the hubs and the spring arms extending at an angle to contact the arm plates respectively to hold the arms against the hub and, prior to the head of the draw bolt means being so drawn, to hold the arms in a position such that the distance between the distal ends of the arms is less than said inside dimension of the tube, the distal ends of the spring arms being closer to said axis than are the distal ends of the engaging arms.

* * * * *